Aug. 25, 1942.  E. V. CRANE  2,293,715
METHOD OF AND APPARATUS FOR MAKING CARTRIDGE BELT LINKS
Filed Jan. 7, 1941  3 Sheets-Sheet 1
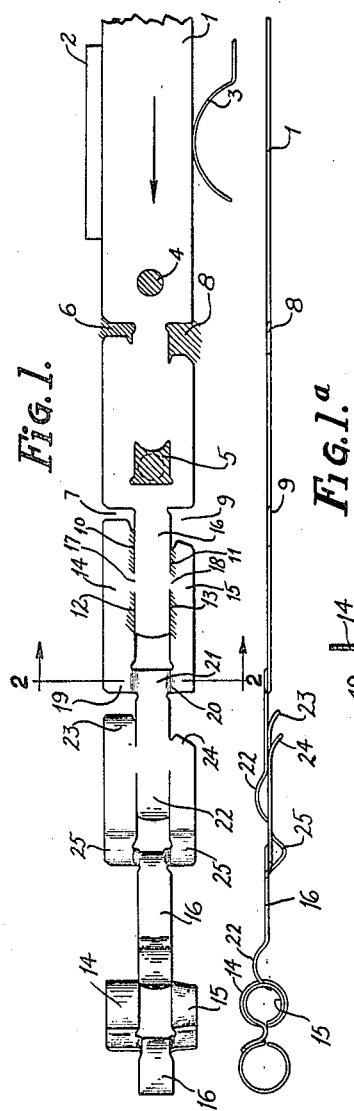
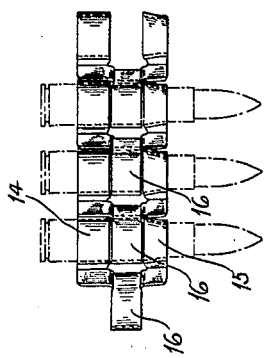
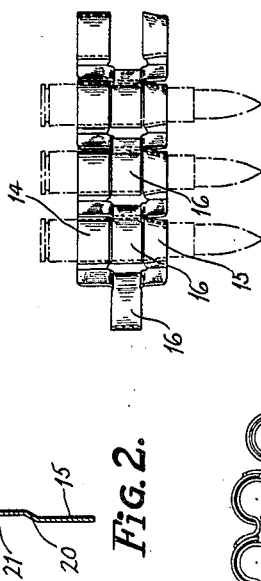
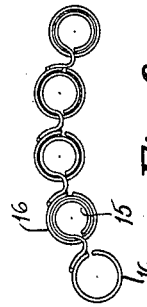
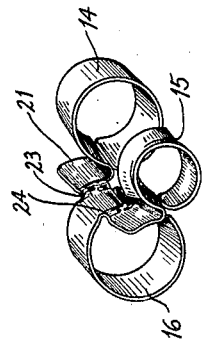
INVENTOR.
EDWARD V. CRANE
BY
Fay, Mackling, Gobrick and Williams
ATTORNEYS.

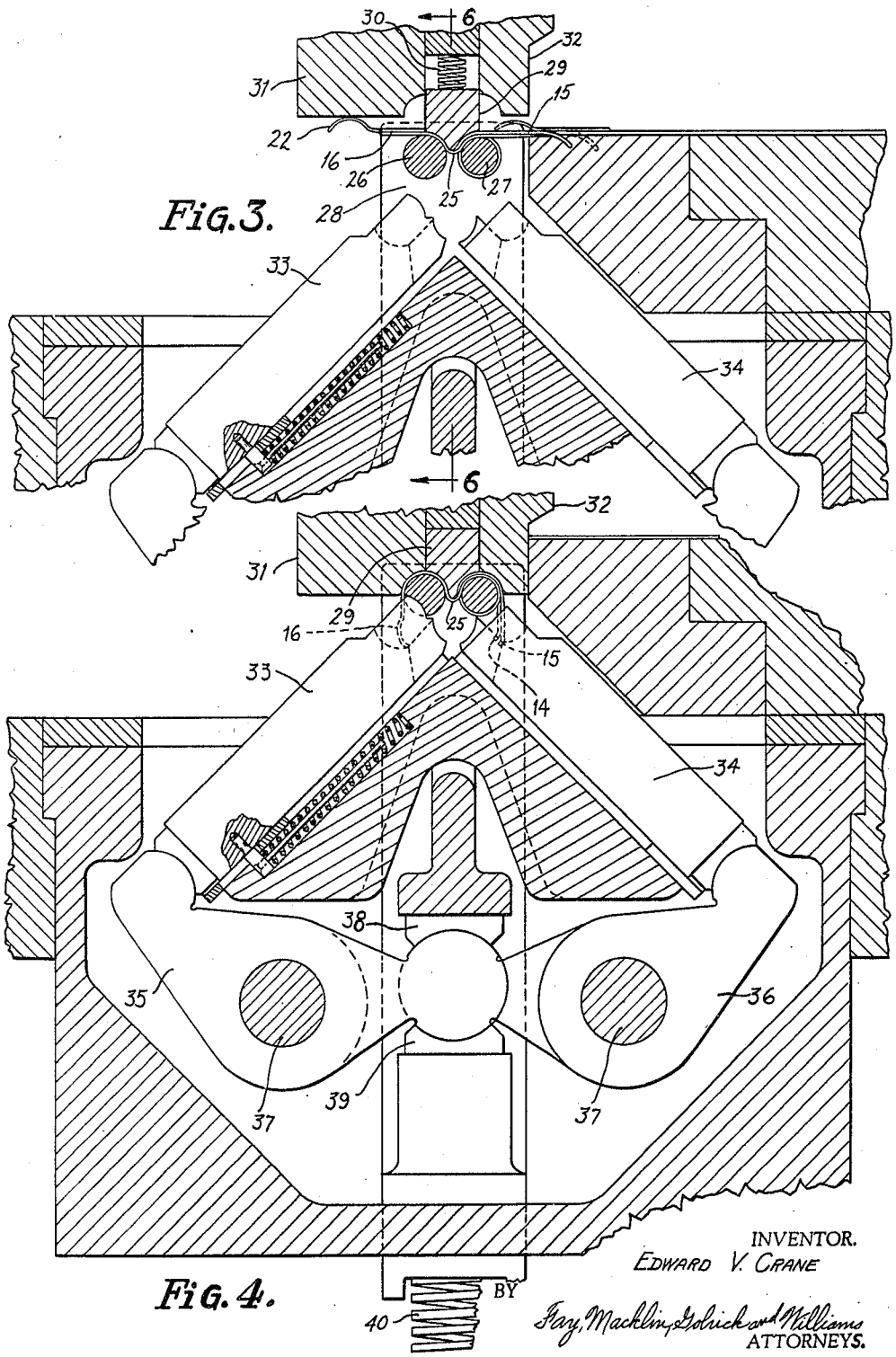

Aug. 25, 1942. E. V. CRANE 2,293,715
METHOD OF AND APPARATUS FOR MAKING CARTRIDGE BELT LINKS
Filed Jan. 7, 1941 5 Sheets-Sheet 3

INVENTOR.
EDWARD V. CRANE
BY
Fay, Macklin, Golrick, and Williams
ATTORNEYS.

Patented Aug. 25, 1942

2,293,715

UNITED STATES PATENT OFFICE 2,293,715

METHOD OF AND APPARATUS FOR MAKING CARTRIDGE BELT LINKS

Edward V. Crane, Brooklyn, N. Y., assignor to E. W. Bliss Company, Brooklyn, N. Y., a corporation of Delaware Application January 7, 1941, Serial No. 373,452

15 Claims. (Cl. 59—15)

This invention is directed to a method and an apparatus for making a cartridge belt link and is likewise directed to a link having certain novel characteristics.

Metallic links which act as connecting elements for cartridge portions to provide a continuous chain have been made in the past. Such links consisted of a pair of spaced elements in axial alignment and in the form of rings which cooperated to receive a cartridge. The two elements were spaced apart to receive a cooperating ring element of a succeeding link in such manner that a cartridge acted as a hinge pintle with the cooperating links acting as a hinge.

The present invention is directed to such a link modified in form over the links heretofore used by the introduction of a coining operation in the forming of the link with the material of the body portion connecting the link elements physically stretched by coining to separate the elements and make the space in an axial direction between the two separated elements greater than the axial length of the element lying between them. The result is a link which has a much freer hinge action and provides a belt which is easier to manipulate and which is not apt to jam due to the locking of the interspaced links together.

Links of the character described are necessarily required in very large numbers and any saving in material or in the operations of fabrication result in considerable economies. To this end the present invention contemplates the use of a strip with minimum wastage or scrap and the fabrication of that strip in the minimum number of operations to provide the greatest possible output per unit machine.

The general object of the invention has been to provide an improved link of the type named, together with a method for making the same and the apparatus embodied in that method. Other objects of the invention will become apparent from the disclosure of the drawings and the specification.

To the accomplishment of the foregoing and related ends, said invention, then, consists of the means hereinafter fully described and particularly pointed out in the claims; the annexed drawings and the following description setting forth in detail certain structure embodying the invention, such disclosed structure constituting, however, but one of various forms in which the principle of the invention may be used.

In said annexed drawings—

Fig. 1 is a plan view, illustrating the progressive stages in the manufacture of cartridge links from ordinary metal strip, in accordance with the invention;

Fig. 1ᵃ is a view of the lower edge of the strip shown in Fig. 1;

Fig. 2 is a cross-sectional view, taken on the line 2—2 of Fig. 1;

Fig. 3 is a view of the forming dies for the finish forming of the cartridge link, and illustrating the beginning of the finish forming operation;

Fig. 4 is a view similar to Fig. 3, but illustrating the first step in the finish forming operation;

Fig. 7 is a perspective view of one of the links;

Fig. 8 is a view showing a number of assembled links and illustrating the flexibility of the assembly; and Fig. 9 is an elevation of a number of assembled links, showing the manner in which they are used to hold cartridges.

Figure 6:
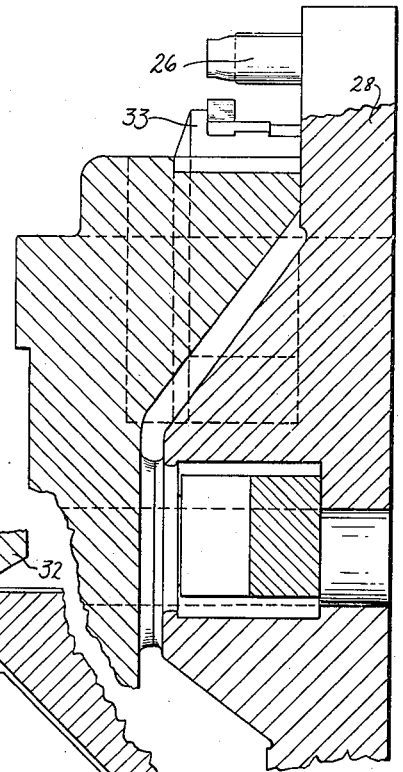
Fig. 6 is a view, partly in elevation, and partly in section, taken on the line 6—6 of Fig. 3, but with portions omitted to more clearly show the mandrels.

In the operation of forming the aforesaid links by progressive stages from a strip of metal, the metal strip I, of predetermined width and thickness is moved intermittently in the direction indicated by the arrow in Fig. 1, the strip passing between a fixed side guard 2 and a spring gauge 3 which urges the strip against the guard.

In a single stroke of the press, all of the operations shown in Fig. 1 are performed, all of the dies necessary for these operations being arranged progressively in the press, in accordance with well-known practices. After each press stroke, the strip is moved forwardly a distance equivalent to the length of the blank used for forming each link, so that each blank is subjected to a number of different successive operations before attaining the finished link form.

In the first operation a notching and piercing punch is employed, which punches out openings 4 and 5 in the strip, and at the same time forms spaced notches 6 and 7 in one edge of the strip and notches 8 and 9 in the edges of the strip opposite notches 6 and 7, the notches 8 and 9 being considerably wider than the notches 6 and 7.

The notches may be used for reception of the finger of an electrical detector, such as described in my co-pending application, Serial No. 373,453, whereby tools are protected against damage due to interference with feeding.

In the second step, the notched and pierced portion of the blank which has just been described, is subjected to a stretching and offsetting operation, in which the blank is slit along the lines 10, 11, 12 and 13 to provide long and short bands 14 and 15 respectively, and a central tongue 16, the tongue 16 being connected to the bands at the points 17 and 18. At the same time, the metal is subjected to a stretching and offsetting operation at the points 19 and 20 (see Fig. 2) to offset the bands 14 and 15 from the body 21 of the blank at this point, the stretching operation further resulting in a spreading apart of the bands 14 and 15 for a purpose to be presently described.

In the next operation, the blank just described is preformed in such a manner as to provide a curved element 22 from a portion of the tongue 16, and downwardly curving elements 23 and 24 from the end portions of the bands 14 and 15 respectively. At the same time the body 21 of the blank and portions of the other ends of the bands 14 and 15 are dished downwardly, as indicated at 25. The blank, as thus preformed, is now ready for the finish forming operation, the various stages of which are illustrated in Figs. 3, 4 and 5.

In the first stage, the preformed blank is disposed as in Fig. 3, that is, with the portion 25 of the blank between a pair of spaced mandrels, 26 and 27, which extend from a vertically movable member 28. A blank holder 29 maintains the blank in engagement with the aforesaid mandrels, this blank holder being resiliently backed by a spring 30. With the blank thus maintained in position, the tongue 16 is bent to the position shown in Fig. 4 by means of a bending die 31 which moves relatively to the blank holder 29, and at the same time, the bands 14 and 15 are bent to the position shown in Fig. 4 by means of a bending die 32, movable simultaneously with the die 31. During this first stage of the finish forming operation, the points 17 and 18 at which the tongue 16 of the next blank is connected to the bands 14 and 15 of the blank which is being finish-formed, are slit by means of suitable shearing dies (not shown) so as to free the blank being finish-formed from the remainder of the strip.

Figure 5:
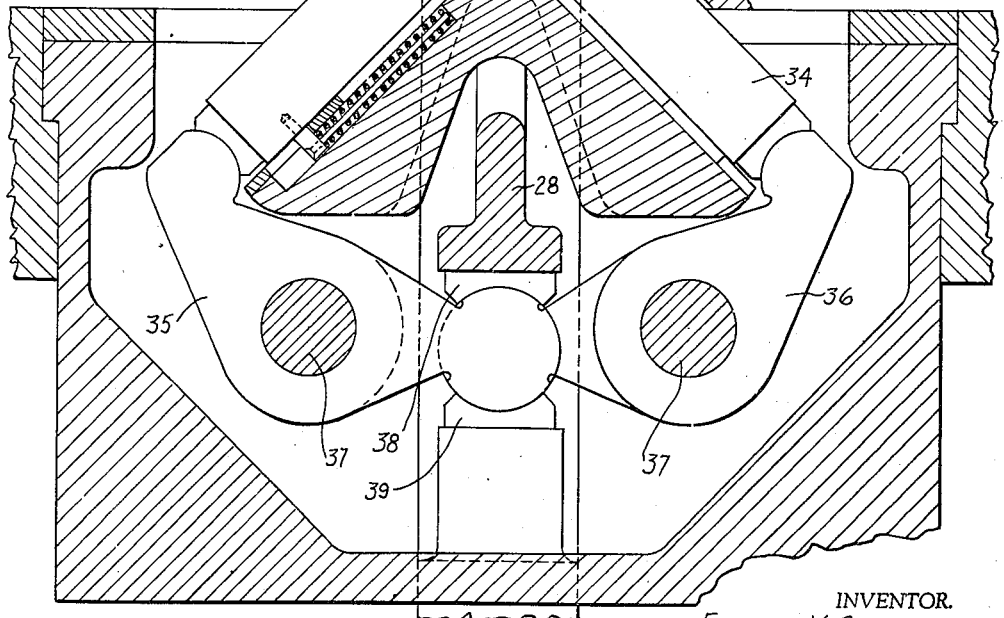
Fig. 5 is a view similar to Fig. 3, but illustrating the final step of the finish forming operation.

In the second stage of the finish forming, the beginning of which is shown in Fig. 4, the down-turned tongue 16 and bands 14 and 15 are engaged by forming dies 33 and 34 respectively, which move to the position shown in Fig. 5 to thereby produce a finished link as shown in Fig. 7. This movement of the dies 33 and 34 is effected in the following manner.

The dies 33 and 34 are disposed in angular relation to each other and are pivotally connected at their lower ends to levers 35 and 36 respectively, which levers are mounted for pivotal movement about stub shafts 37. The levers are engaged at their inner ends by socket elements 38 and 39, which are rigidly connected to the member 28 so that as the member 28 moves downwardly, the levers 35 and 36 are rocked about their pivotal connections to thereby force the dies 33 and 34 to the position shown in Fig. 5.

At the conclusion of the second phase of the finish forming operation, the dies 33 and 34 are returned to their normal position, as shown in Fig. 3, by upward movement of the member 28 which is thus moved by a spring 40. At the same time, the dies 31 and 32 and blank holder 29 are returned to their initial positions, following which, the finished link is ejected from the mandrels 26 and 27 by means of suitable ejecting mechanism (not shown).

Referring to Fig. 7, it will be noted that the bending of the tongue 16 and bands 14 and 15 has resulted in the formation of annular elements, the elements 16 being of substantially the same diameter as the element 14, but the element 15, which is in axial alignment with the element 14 is of smaller diameter than the latter, and tapers in diameter from top to bottom.

The spreading and offsetting at the points 23 and 24 has resulted in a spreading apart of the elements 14 and 15 to an extent such that the element 16 of another link can be easily inserted into this space, as shown in Fig. 9, and when so inserted, a cartridge, as shown by the dotted lines, can be inserted through the aligned elements 14, 15 and 16. The cartridge thus acts as a means for assembling two links, and in this manner, a belt of cartridges of any desired length can be made, as clearly indicated in Fig. 9.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. The method of making links of the character described from a strip of material in a series of successive operations comprising the steps of cutting the strip to provide blanks corresponding in outline to the finished links, slitting said strip to provide two outer tongues and an intermediate tongue, said outer tongues forming part of one link and said intermediate tongue forming part of the next successive link, effecting a spreading action to bodily space the two outer tongues laterally from their respective intermediate tongue and thereafter forming the outer tongues of each link into substantially aligned rings and the intermediate tongue into a ring at the side of said aligned rings.

2. The method of making links of the character described from a strip of material in a series of successive operations comprising the steps of cutting the strip to provide blanks corresponding in outline to the finished links, slitting said strip to provide two outer tongues and an intermediate tongue, said outer tongues forming part of one link and said intermediate tongue forming part of the next successive link, simultaneously effecting an off-setting and a spreading action to bodily space the two outer tongues out of the plane of and laterally spaced from their respective intermediate tongue and thereafter forming the outer tongues of each link into substantially aligned rings and the intermediate tongue into a ring at the side of said aligned rings.

3. The method of making links of the character described from a strip of material in a series of successive operations comprising the steps of cutting the strip to provide blanks corresponding to outline to the finished links, slitting said strips to provide two outer tongues and an intermediate tongue, said outer tongues forming part of one link and said intermediate tongue forming part of the next successive link, said tongues remaining joined adjacent their respective mid-sections and separated at their respective ends and roots, simultaneously effecting an off-setting and a spreading action to bodily space the two outer tongues out of the plane of and laterally spaced from their respective intermediate tongue and thereafter forming the outer tongues of each link into substantially aligned ring and the intermediate tongue into a ring at the side of said aligned rings.

4. The method of making a link of the character described from metal strip, which comprises stamping from said strip a blank consisting of a body portion which is as wide as the said strip, a pair of spaced parallel bands extending from one edge of said body portion and a single tongue extending from the other edge of said body portion, increasing the space between said bands, and forming said bands and tongue into carriage-receiving elements.

5. The method of making a link of the character described from metal strip, which consists in stamping from said strip a blank consisting of a body portion, spaced parallel bands extending from one edge of said body portion and a single tongue extending from the other edge of said body portion, off-setting said bands from the plane of said tongue, and then forming said bands and tongue into cartridge-receiving elements.

6. The method of making a link of the character described from metal strip, which comprises stamping from said strip a blank consisting of a body portion, spaced parallel tongues extending from one edge of said body portion and a single tongue extending from the other edge of said body portion in staggered relation with said bands, said tongue being equal in width to the space between said bands, and offsetting said bands from the plane of said tongue and simultaneously spreading the metal at the points of offset to increase the distance between said bands, and then forming said bands and tongue into cartridge-receiving form.

7. In apparatus for making links of the character described, three die members with forming die surfaces thereon mounted for movement relative to each other to cooperate to form a link, a floating mandrel member mounted between said three members for cooperation therewith and resilient means to return said mandrel to a predetermined position at the end of the link forming operation.

8. In apparatus for making links of the character described, three die members with forming die surfaces thereon mounted for movement relative to each other to cooperate to form a link, a floating mandrel mounted between said three members for cooperation therewith, a shoulder rigid with one of said die members against which said mandrel member is forced during the forming operation and resilient means to return said mandrel to a predetermined position at the end of the link forming operation.

9. In apparatus for making links of the character described, three die members with forming die surfaces thereon mounted for movement relative to each other in a common plane to cooperate to form a link, a floating mandrel member mounted between said three members for cooperation therewith, guideways to limit the movement of said mandrel member to a direction parallel to said plane, and resilient means to return said mandrel to a predetermined position at the end of the link forming operation.

10. In apparatus for making links of the character described, three die members with forming die surfaces thereon mounted for movement relative to each other to cooperate to form a link, a floating mandrel member comprising two mandrels mounted between said three members for cooperation therewith, means to move two of said die members in intersecting paths to each cooperate with both of said mandrels to form said link and resilient means to return said mandrel to a predetermined position at the end of the link forming operation.

11. In apparatus for making links of the character described, three die members each forming die surfaces thereon mounted for movement relative to each other to cooperate to form a link, a floating mandrel member comprising two mandrels mounted between said three members for cooperation therewith, a shoulder rigid with one of said die members against which said mandrel member is forced during the forming operation, means to move two of said die members in intersecting paths to each cooperate with both of said mandrels to form said link and resilient means to return said mandrel to a predetermined position at the end of the link forming operation.

12. In apparatus for making links of the character described, three die members with forming die surfaces thereon mounted for movement relative to each other in a common plane to cooperate to form a link, a floating mandrel member comprising two mandrels mounted between said three members for cooperation therewith, a shoulder rigid with one of said die members against which said mandrel member is forced during the forming operation, guideways to limit the movement of said mandrel member to a direction parallel to said plane, means to move two of said die members in intersecting paths to each cooperate with both of said mandrels to form said link and resilient means to return said mandrel to a predetermined position at the end of the link forming operation.

13. In apparatus adapted to form an article of the type described from a strip of material, a mandrel about which to wrap said material, resilient means to normally support said mandrel in the path of feeding of said strip, a die member movable toward said mandrel and a solid shoulder against which said mandrel is forced by said die member upon movement.

14. In apparatus adapted to form an article of the type described from a strip of material, a mandrel about which to wrap said material, resilient means to normally support said mandrel in the path of feeding of said strip, a plurality of die members movable toward said mandrel in intersecting lines of movement and a solid shoulder against which said mandrel is forced by said die members upon said intersecting movement.

15. The method of making a link of the character described from metal strip, which comprises stamping from said strip a blank consisting of a body portion, a pair of spaced parallel bands adjoining said body portion at the upper and lower edges thereof, and a single tongue extending from one of the side edges of said body portion, stretching the metal at the junction of said parallel bands with said body portion to increase the distance between said bands, and forming said bands and tongues into annular cartridge-receiving elements.

EDWARD V. CRANE.